March 30, 1965  G. R. DEHN  3,175,858
VEHICLE
Filed Jan. 28, 1964  2 Sheets-Sheet 2
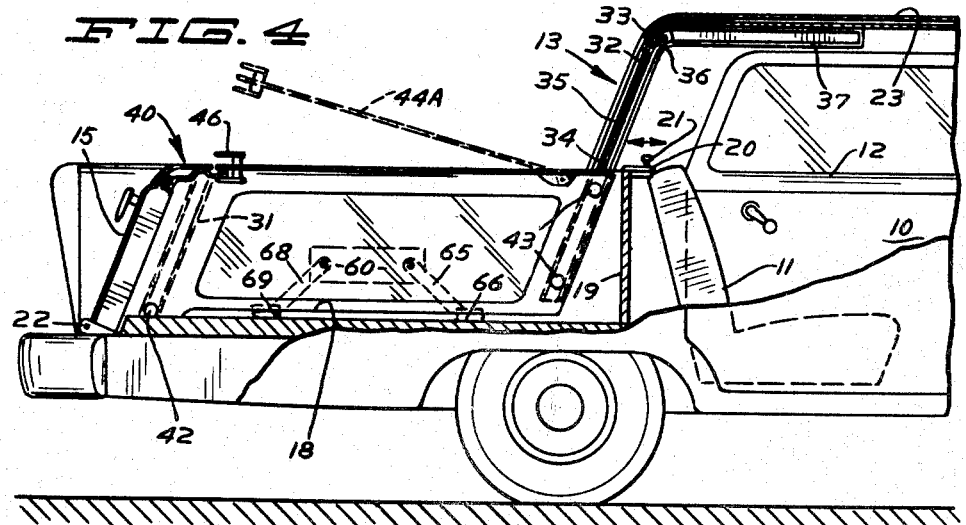
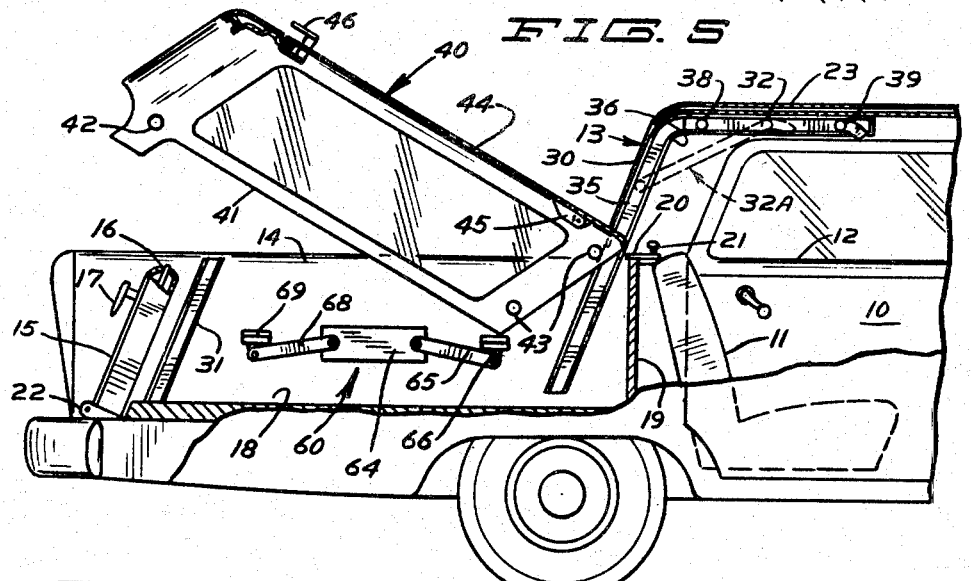
INVENTOR.
GORDIAN R. DEHN
BY
Carlsen, Carlsen & Sturm
ATTORNEYS

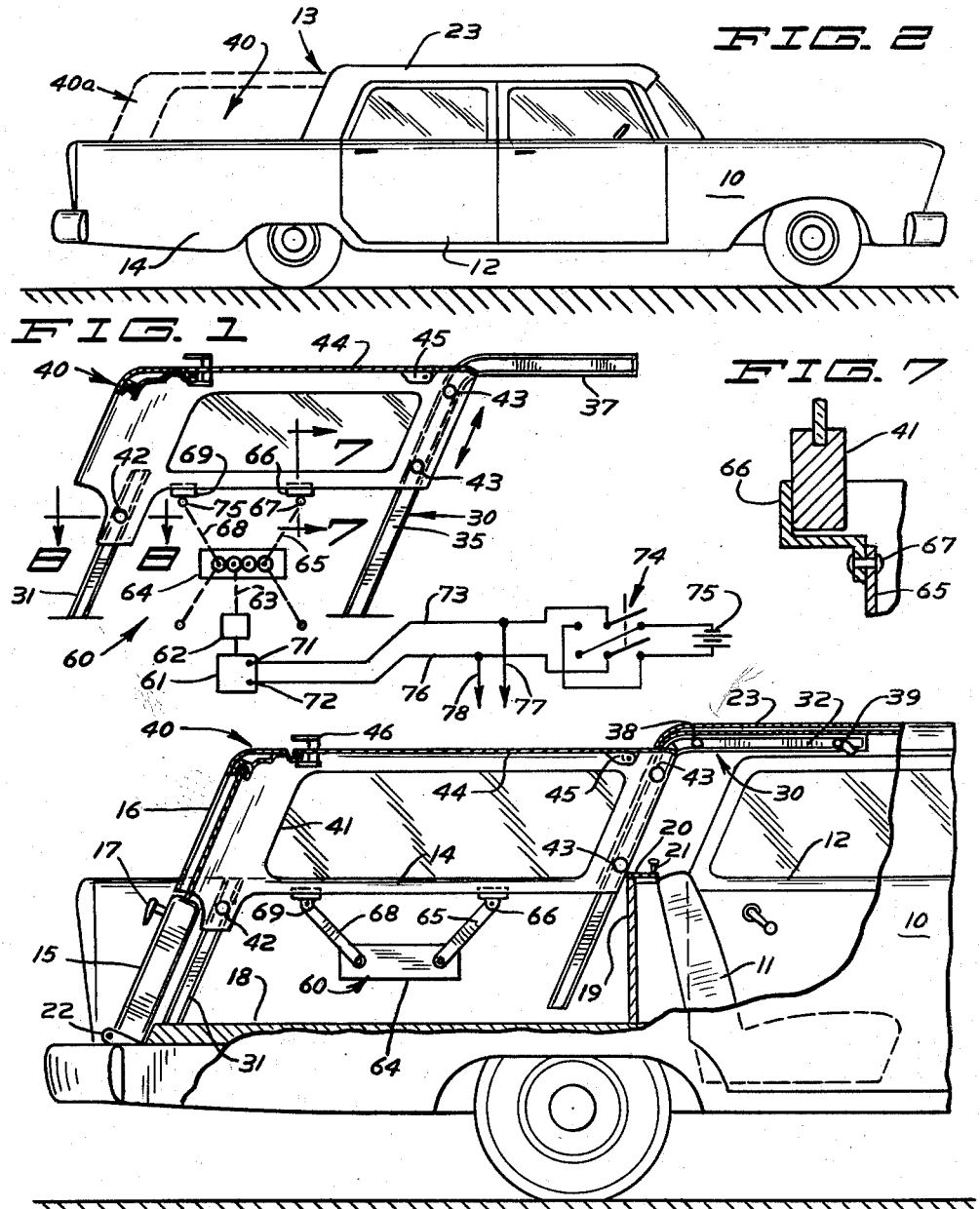

3,175,858
VEHICLE
Gordian R. Dehn, 6944 Osseo Road, Minneapolis, Minn.
Filed Jan. 28, 1964, Ser. No. 340,600
4 Claims. (Cl. 296—117)

This invention relates generally to vehicles and is more particularly related to convertible vehicles of the type which may be utilized for performing a plurality of functions.

The prior art contains numerous examples of various vehicles designed to provide particular functions in addition to the primary function of transporting persons or objects from one location to another. There are also present in the prior art many types of vehicles which are designed for special purposes. For example, a pickup truck is designed to transport objects and passengers from one location to another but presents an appearance which is not always consistent with the wishes of an operator. In the same manner, the conventional sedan having an enclosed body is primarily useful for transporting persons from one location to another and most generally presents a pleasing appearance that is acceptable to most operators. The sedan, however, does not provide a great deal of utility for transporting objects of more than a nominal size and shape from one location to another. As will be set forth in connection with the drawings and specification below, my invention provides a useful and improved vehicle which may be utilized either as a totally enclosed sedan, a totally enclosed station wagon or as a pickup truck without requiring any substantial modification nor detracting from the particular funtion which the operator of the vehicle happens to be using at any given time.

It is therefore an object of my invention to provide a novel and improved vehicle having increased utility.

Another object of my invention is to provide an improved vehicle which may be utilized as a totally enclosed sedan, a totally enclosed station wagon or a pickup type truck.

It is a further object of my invention to provide an improved versatile vehicle which may be operative in one of three modes while retaining the functional desirable characteristics of any one of the modes and presenting a pleasing appearance consistent with the mode in which the vehicle is operating.

A further object of my invention is to provide an improved convertible vehicle.

A still further object of my invention is to provide improved apparatus in combination with a vehicle to allow use of the vehicle under different conditions of operation.

These and other objects will become apparent from a consideration of the appended specification, claims and drawings, in which:

FIG. 1 is a side elevation sectional and schematic view of a portion of a vehicle showing one embodiment of my invention;

FIG. 2 is a side elevational view of a vehicle of the class to which my invention is applied;

FIGS. 3, 4 and 5 are enlarged sectional and broken away views of the rear portion of the vehicle shown in FIG. 2 which illustrate the various positions of the apparatus of which one operative embodiment of my invention is comprised;

FIG. 6 is an enlarged broken away plan view of the rear portion of the vehicle of FIG. 2;

FIG. 7 is an enlarged sectional view taken along section lines 7—7 on FIG. 1; and FIG. 8 is an enlarged sectional view taken along section lines 8—8 on FIG. 1.

Referring generally to FIGS. 2, 3, 4, 5 and 6 of the drawing, it may be seen that my invention is shown embodied as a portion of a vehicle indicated generally by reference character 10 which presents an appearance of the familiar conventional sedan type automobile. My invention is shown positioned on and in the rear portion of vehicle 10 and, as may be noted from the drawing, the rear portion of vehicle 10 intermediate rearwardly extending side fender panels 14 is comprised generally of a substantially rectangular shaped recess, not unlike the trunk on a standard sedan type automobile. As will be explained in detail below, the recess in the rear portion of vehicle 10 contains a slidably mounted cover member 40 which is operative between downwardly retracted and upwardly extended positions to allow use of the vehicle as a sedan or station wagon respectively. Cover member 40 is also removably mounted so that the vehicle may be operative as a pickup type truck. Cover member 40 is also provided with a hinged lid portion 44 to provide access to the recess in the rear portion of vehicle 10 when in a retracted position and to allow egress to the rear portion of vehicle 10 when in the upwardly extended position.

Referring to FIGS. 3, 4, 5 and 6 of the drawings, it may be seen that my apparatus is symmetrical about a longitudinal vertically extending plane and therefore only one side of vehicle 10 is shown in the drawings and it will be assumed that those skilled in the art with which my invention is concerned will readily perceive the structure and operation of my invention.

The recess in the rear portion of vehicle 10 has a partition member 19 extending across the lower front portion thereof which is held in place by suitable fastening means and may, under some circumstances, be removable from the vehicle dependent upon the wishes of the operator. Member 19 is of generally rectangular shape and includes a slidable laterally extending horizontal apron 20 which is provided with an actuator knob 21 and is slidably journaled for forward and rearward movement with respect to the longitudinal axis of the vehicle to provide sealing engagement with the lower portion of a slidably removable rear window member 32 that is operative to provide a closure for a rearward facing opening positioned in the top rear of the body of vehicle 10 as indicated generally by reference character 13. Partition 19, is also positioned slightly rearwardly of a conventional seat 11 which is positioned adjacent the rear doors 12 of vehicle 10. Partition member 19, slidable apron 20 and window 32 cooperate to effectively seal the rear portion of the body of vehicle 10 when the vehicle is being utilized as a pickup type truck with cover member 40 removed from the vehicle.

The recess in the rear portion of vehicle 10 is provided with a generally horizontally extending bed portion 18 which extends intermediate the side panel members 14, front partition member 19 and a tailgate 15 which is hingedly mounted on hinge members 22, a handle 17 and a window member 16 which may be extended and retracted from within tailgate member 15 by suitable operating means (not shown) in a conventional manner as found on a conventional station wagon type of vehicle. It may therefore be seen that the recess in the rear portion of vehicle 10 is defined by side panel members 14, front partition member 19 and tailgate member 15.

Cover member 40 is dimensioned to be slidably received in the recess at the rear of vehicle 10 and includes a pair of downwardly extending side portions 41 which are connected by laterally extending portions at the front and rear top thereof to define a generally rectangular opening in the top surface. A lid member 44 adapted to fit in the generally rectangular opening is hinged to the laterally extending front top portion through suitable hinge means 45 and is provided with suitable latching means 46 which includes a conventional handle and locking mechanism whereby lid 44 may be raised for ingress and egress through the top of cover member 40 when in its retracted or extended position. The side portions 41 of cover member 40 are provided with a pair of guide channel engaging pins 43 at the front portion thereof and a further guide channel engaging member 42 at the lower end of the rear portion. As will be explained in detail below, guide channel engaging pin members 42 and 43 are adapted to be slidably journaled for reciprocatory motion in channel members 31 and 30 respectively. It may be further noted that guide channel engaging pin members 42 and 43 may be of identical construction which is shown in the enlarged sectional view of pin 42 on FIG. 8.

Referring specifically to FIG. 8, the downwardly extending rear portion of side 41 on cover member 40 is provided with an aperture 50 which is dimensioned to receive a bearing member 51 to be suitably rotatably journaled on the end of pin member 42. Pin member 42 extends through an aperture provided in a bearing member 49 which is attached, as by welding, to the inside of inside portion 41 on cover member 40 and is provided with a recess for receiving bearing member 51. A spring biased detenting member 79, which may be, for example, a ball bearing of suitable size, extends inwardly and in communication with the aperture in member 49 in which pin member 42 is slidably journaled. Suitably positioned grooves 47 and 48 are provided in pin member 42 for coaction with detenting member 79 whereby the end of pin member 42 upon which bearing member 51 is journaled may be extended and retracted between positions of slidable engagement and disengagement with a channel member 32.

Pin member 42 on cover member 40 is reciprocably journaled in an upwardly extending U-shaped channel member 32 which is inclined at a slight forward angle and is held in place on the inside of side portions 14 on vehicle 10 through suitable fastening means (not shown). In a similar manner, bearing members 43 on the front end of side portion 41 on cover member 40 are reciprocably journaled in a U-shaped channel member 30 having an upwardly extending inclined portion 35 that extends generally parallel to channel member 31 and is attached, at its lower extremities, to the inside of side portion 14 on vehicle 10 through suitable fastening means (not shown). Channel member 30 extends upwardly into proximity with the rear portion of the side of roof 23 on vehicle 10 and includes a curved portion 36 from which depends a further generally horizontally positioned portion 37 which is attached through suitable fastening means (not shown) to side and lower portion of roof 23 on vehicle 10. It may thus be seen that when pin members 42 and 43 are in the extended position shown in FIG. 8, member 40 may be retracted to the position shown in FIG. 4 or extended upwardly to the position shown in FIG. 3 to provide a sedan and station wagon type vehicle body respectively.

Window 32 is generally rectangular in shape and includes a peripherally mounted frame member which has a seal 33 at the top edge adapted to coact with the downwardly curved portion of roof 23 on vehicle 10 and a further sealing means 34 extending across the bottom thereof to coact with and seal the top surface of cover member 40 when in its retracted position, as for example, in FIG. 4. Each of the end frame members on window 32 has first and second bearing members 38 and 39 which extend outwardly thereof and into slidable window retaining relationship with U-shaped channel member 30 as indicated in the raised position of window 32 in FIG. 5 and the intermediate position shown in dotted outline and indicated by reference numeral 32A on FIG.

Window 32 may be operated between raised and lowered positions merely by exerting a force in the desired direction and the bearing members 38 and 39 extending outwardly from each end into channel member 30 will serve to retain the window in the desired position and relationship with the remainder of the apparatus comprising my invention.

In the side elevation, section and schematic diagram of FIG. 1, a suitable actuating means 60 is shown comprised of an electrical motor means 61 having a pair of input terminals 71 and 72, a gear box 62 driven by motor 61, and a further gear box 64 connected to gear box 62 through driving means 63. Gear box 64 contains a plurality of gears including a pair of oppositely rotatable output gears which are connected in driving relationship to a pair of actuator arms 65 and 68. Actuator arm 65 is rotatably connected to a channel member 66 which is adapted to slidably receive the lower generally horizontally extending portion of side 41 of cover member 40 and is connected to actuator arm 65 through suitable fastening means, shown in the form of a rivet 67. In a similar manner a second channel member 69 is connected to actuator arm 68 through suitable fastener means 70. Gear box 64 is mounted in a suitable position for extending and allowing the retraction of cover member 40 and may be fastened in place on the inside of rearwardly extending side members 14 on vehicle 10 through suitable fastening means (not shown). Terminals 71 and 72 on motor 61 may be energized from a suitable source of electrical energy, shown in the form of a battery 75, through conductor 76 and reversible switch means 74 and conductor 73. Conductors 77 and 78 connected to conductors 73 and 76 respectively may be connected to like corresponding apparatus associated with the other side portion 41 on cover member 40. The various positions assumed by actuator arms 65 and 68 relative to driving means 60 and the lower portion of the sides 41 on cover member 40 may be observed on FIGS. 3, 4 and 5 for various positions of cover member 40. Upon becoming familiar with the principles of my invention, various other forms of driving mechanisms and means for retracting and extending cover member 40 may become apparent to those skilled in the art.

*Operation*

Normal operation of the vehicle may be assumed to be that of FIG. 2 in which cover member 40 is in a retracted position and window 32 is in an extended sealing position as shown on the enlarged broken away sectional view of FIG. 4 with sealing means 34 in sealing relationship with the front transversley extending portion of the top of cover member 40 and sealing means 33 in sealing relationship with the downwardly curving portion of roof 23 on vehicle 10. Window 16 is, of course, retracted into tailgate member 15 which may, if desired, be utilized for access to the cavity enclosed by the rear portion of the body of vehicle 10 and cover member 40. Further access to the cavity may be obtained by raising lid 44 as illustrated by the dotted portion, 44A, of FIG. 4 in a manner not unlike that utilized in trunk lids on conventional sedan type automobiles.

When it is desired to operate the vehicle as a station wagon, window 32 is raised manually and reversible switch mean 74 is placed in a position which will cause motor means 61 to drive gear box 64 through gear box 62 and driving means 63 to cause actuator arms 65 and 68 to rotate from the position shown in FIG. 4 to the position shown in FIG. 3 to extend cover member 40 upwardly to a position wherein the forward laterally extending top portion engages the underside of the rear of roof 23 and cover member 40 is retained in position by actuator arms 65 and 68 in cooperation with bearing pin members 43 and 42. When in the position shown in FIG. 3, window 16 in tailgate 15 may be raised to complete the enclosure of the body of the vehicle. If desired, a third seat may be added to the vehicle by attaching to the bed 18 by suitable fastening means and access thereto may be had by opening tailgate 15. It might also be noted that seat 11 may be folded forwardly as in many conventional station wagons and partition 19 may be removed to allow use of the entire portion of vehicle 10 rearward of the front seat for transporting objects and materials. It may also be noted that the lid 44 may be provided with the type of hinge mechanism that may be disengaged so that complete removal thereof is possible to allow access to the rear portion of vehicle 10 through the top of cover member 40.

FIG. 5 illustrates the third mode of operation of vehicle 10 when provided with my apparatus. In FIG. 5, cover member 40 is shown in a partially removed position in which bearing pin members 42 and 43 have been retracted from the position shown in FIG. 8 to a position in which bearing member 51 is retracted into recess 50 on side portion 41 of cover member 40 and the recess provided in mounting means 49. In such position, groove 48 on pin 42, for example, is engaged by detent 79 to retain bearing member 51 in a retracted position. Under these conditions, cover member 40 may be lifted upwardly and rearwardly and completely removed from the vehicle by appropriate lifting means or through manual efforts of an operator. In removing cover member 40, it may be necessary to open tailgate 15 and, if desired, driving means 60 may be utilized to aid in removing cover member 40. After cover member 40 has been removed, window 32 may be closed by placing the same in the position shown in FIG. 4 and transverse apron member 20 may be moved rearwardly to seal against the lower inside edge, 34, of window 32. In the third mode of operation, the rear portion of vehicle 10 may be utilized in the same manner as is found on the conventional pickup type truck to accommodate articles and objects which may not be otherwise carried in a sedan or station wagon type vehicle.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A convertible vehicle comprising:
   a front portion including a stationary roof and body structure including at least one rear recess opening;
   a rearwardly extending portion depending therefrom, said rearwardly extending portion including a pair of stationary sidewalls and a rear wall to define a recess, said rear wall having a hinged access opening, said rear wall of the recess also having a window slidably journaled thereon to be extended upwardly therefrom;
   a cover member for said rearwardly extending portion, said cover member having a hinged top portion and a pair of laterally disposed side portions, said cover member being engaged by said window when the window is in extended position;
   and means releasably, slidably journaling said side portions for substantially vertical slidable movement within said recess whereby said cover member is operable between raised and lowered positions.

2. In combination with a vehicle of the class having a body, a stationary roof, an access opening at the rearward end of the body and a recess depending rearwardly from the access opening:
   a cover member including a top and laterally disposed downwardly extending side portions;
   means on the sides of the recess for slidably receiving said cover member and including a plurality of channel members and a plurality of channel engaging members extending outwardly from the side portions of the cover member into said channel members whereby said cover member may be operative between retracted and upwardly extended positions relative to said recess, said channel engaging members being movable between extended and retracted positions relative to the side portions of the cover member whereby the cover member may be removed from the vehicle;
   and means for covering the exposed portion of the access opening in said vehicle when said cover member is retracted into said recess.

3. The apparatus of claim 2 in which motor means, operable to extend and retract the cover member substantially in parallelism with the bottom of the recess, are operatively engaged with the side portions of the cover member.

4. In combination with a vehicle of the class having a body, a stationary roof, an access opening at the rearward end of the body and a recess depending rearwardly from the access opening:
   a cover member including a top and laterally disposed downwardly extending side portions;
   means on the sides of the recess for slidably receiving said cover member and including a plurality of channel members and a plurality of channel engaging members extending outwardly from the side portions of the cover member into said channel members, a pair of said channel members being laterally disposed and extending upwardly at the sides of the access opening and forwardly into the body of the vehicle and a closure member being slidably journaled therebetween;
   means for covering the exposed portion of the access opening in said vehicle when said cover member is retracted into said recess;
   and a further closure member removably mounted in the lower portion of said access opening and including a laterally extending portion slidably mounted at the top of said further closure member and operable to sealingly engage the lower edge of the closure member.

References Cited by the Examiner
UNITED STATES PATENTS

| 798,447 | 8/05 | Pfleghar | 296—84 |
| 1,800,514 | 4/31 | Dupre | 296—107 X |
| 2,686,076 | 8/54 | Helser | 296—107 |
| 2,793,907 | 5/57 | Hess et al. | 296—106 |

A. HARRY LEVY, *Primary Examiner.*